United States Patent [19]

Narita

[11] Patent Number: 4,572,024
[45] Date of Patent: Feb. 25, 1986

[54] RACK AND PINION STEERING GEAR
[75] Inventor: Katsuyuki Narita, Zama, Japan
[73] Assignee: Nissan Motor Co., Ltd., Yokohama, Japan
[21] Appl. No.: 637,767
[22] Filed: Aug. 6, 1984
[30] Foreign Application Priority Data
  Aug. 9, 1983 [JP] Japan .................. 58-146036
[51] Int. Cl.⁴ .............................. B62D 3/12
[52] U.S. Cl. ........................ 74/498; 74/422; 280/96
[58] Field of Search ........ 74/89.17, 422, 498; 180/148; 280/96

[56] References Cited
U.S. PATENT DOCUMENTS
  4,127,186 11/1978 Koyano et al. .......... 180/148
FOREIGN PATENT DOCUMENTS
  1181353 2/1970 United Kingdom .

OTHER PUBLICATIONS
Abstract of Japanese Patent 58-97561, issued 6-10-1983, titled "Rack and Pinion Type Power Steering"; inventor: Suzuki.

Primary Examiner—Allan D. Herrmann
Attorney, Agent, or Firm—Schwartz, Jeffery, Schwaab, Mack, Blumenthal & Evans

[57] ABSTRACT

A ball joint which includes a ball member ending in a ball is arranged so that the ball member is axially alignable with a straight line which is parallely offset from the center axis of a rack gear, simultaneously with an end of a gear housing to which an end of a protective boot is attached being formed to have a circular outer periphery of which center is equidistant from the center axis of the rack gear and the center of rotary motion of the ball joint when viewed in an elevation perpendicular to the center axis of the rack gear.

4 Claims, 2 Drawing Figures

RACK AND PINION STEERING GEAR

BACKGROUND OF THE INVENTION

1. Field of the Invention

The present invention relates in general to rack and pinion steering gears for road vehicles and more particularly to a protective boot or rubber boot for covering an end of a rack gear and a ball joint through which the rack gear is joined to a tie rod.

2. Description of the Prior Art

There has been proposed by the Japanese Provisional Patent Publication No. 58-97561 a road vehicle rack and pinion steering gear that can be designed so as to effect a desired suspension characteristic even when its gear train (pinion, rack gear, gear housing, etc.) must be placed in a certain limited position so as to not to interfere or contact with an adjacent transmission, etc.

In the steering gear, a ball joint which joins an end of a rack gear to a tie rod is adapted to have a center of rotary motion which is offset from the center axis of the rack gear so that a steering linkage (tie rod, knuckle arm, etc.) can be arranged at a place not interfering or contacting with a suspension, etc. and at the same time enabling the steering gear to effect a desired suspension characteristic.

The ball joint includes a ball member ending in a ball and arranged so that the axis of the ball member is perpendicular to the center axis of the rack gear. The ball member has a tapered shank fitted in a correspondingly shaped transverse hole in the rack gear and fastened thereto by a nut.

Such a steering gear has a problem that it requires a plurality of rubber boots or a complicatedly shaped rubber boot for covering the end of the rack gear and the ball joint, resulting in an increased number of constituent parts or a deteriorated durability of the rubber boot.

SUMMARY OF THE INVENTION

In accordance with the present invention, there is provided a novel and improved rack and pinion steering gear.

The steering gear comprises as usual a gear housing mounted on a vehicle body, a pinion enclosed in the gear housing and rotatable with a manually operated steering wheel, a rack gear enclosed in the gear housing and meshed with the pinion for reciprocating motion, a tie rod for transmitting motion of the rack gear to a steerable vehicle wheel, a ball joint connecting the tie rod to the rack gear and having a center of rotary motion which is offset from the center axis of the rack gear, and a protective boot covering the ball joint and an associated end of the rack gear and having opposed ends respectively attached to an end of the gear housing and an end of the tie rod.

In accordance with the present invention, the ball joint which includes a ball member ending in a ball is arranged so that the ball member is axially alignable with a straight line which is parallely offset from the center axis of the rack gear, simultaneously with the aforementioned end of the gear housing to which an end of the protective boot is attached being formed to have a circular outer periphery of which center is nearly equidistant from the center axis of the rack gear and the center of rotary motion of the ball joint when viewed in an elevation perpendicular to the center axis of the rack gear.

The above structure makes it possible to effectively solve the problem noted above.

It is accordingly an object of the present invention to provide a novel and improved rack and pinion steering gear for a road vehicle which can effectively solve the problem noted above.

It is another object of the present invention to provide a novel and improved rack and pinion steering gear for a road vehicle of the aforementioned character which can improve the durability of the protective boot which covers an end of the rack gear and the ball joint without deteriorating the seal of the rack gear and the ball joint while at the same time retaining freedom of arrangement of the steering linkage.

It is a further object of the present invention to provide a novel and improved rack and pinion steering gear for a road vehicle of the aforementioned character which enables the gear housing as well as the protective boot to be compact in size.

BRIEF DESCRIPTION OF THE DRAWINGS

The features and advantages of the rack and pinion steering gear according to the present invention will beome more clearly appreciated from the following description taken in conjunction with the accompanying drawings, in which.

DETAILED DESCRIPTION OF THE PREFERRED EMBODIMENT

Figure 1:
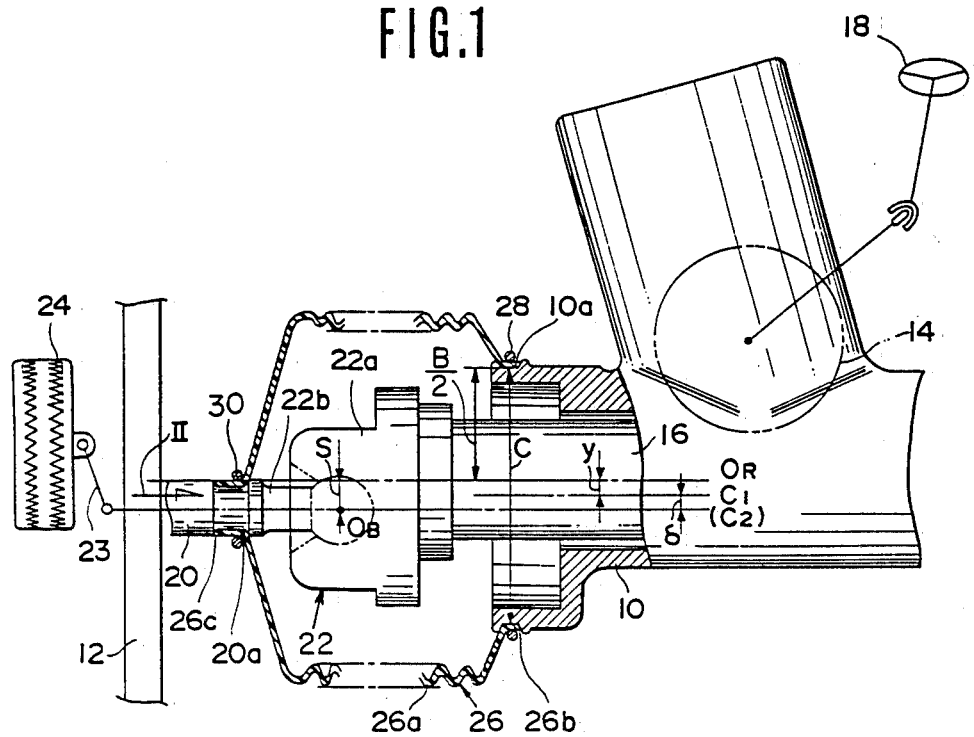
FIG. 1 is a partly sectional fragmentary plan view of a novel main portion of a rack and pinion steering gear according to the present invention, with some parts which are constructed and arranged in the conventional manner being schematically illustrated.

Referring now to the drawings, designated by the reference numeral 10 is a gear housing which is mounted on a vehicle body 12 in a manner to elongate in the lateral directions of same. The gear housing 10 encloses and supports a pinion 14 and a rack gear 16 in a rotatable manner. The pinion 14 is connected to a manually operated steering wheel 18 to rotate together therewith, and the rack gear 16 is meshed with the pinion 14 for lateral reciprocating motion.

As is commonly known, rotation of the steering wheel 18 causes the pinion 14 to rotate and move the rack gear 16 in the lateral directions of the vehicle body 12.

Th rack gear 16 which is disposed within the gear housing 10 and elongates in the lateral directions of the vehicle body 12 is joined at an end thereof to a tie rod 20 by way of a ball joint 22. The ball joint 22 consists of a socket member 22a ending in a socket (no numeral) and a ball member 22b ending in a ball (no numeral) and swingably joined to the socket member 22a. The socket member 22a is secured to the end of the rack gear 16 while the ball member 22b to the tie rod 20.

In this connection, it is to be noted that the ball joint 22 is adapted to have a center $O_B$ of rotaty motion which is offset from the center axis $O_R$ of the rack gear 16 by a predetermined distance S and at the same time constructed and arranged so that the ball member 22b elongates along the extension of the center axis $O_R$ of the rack gear 16 or more precisely to say, the ball member 22b is axially alignable with a straight line which is parallel with or parallely offset from the center axis $O_R$ of the rack gear 16.

The tie rod 20 is joined through a knuckle arm 23 to a steerable vehicle wheel 24 so that movement of the rack gear 16 causes the tie rod 20 to move and turn the steerable vehicle wheel 24.

Figure 2:
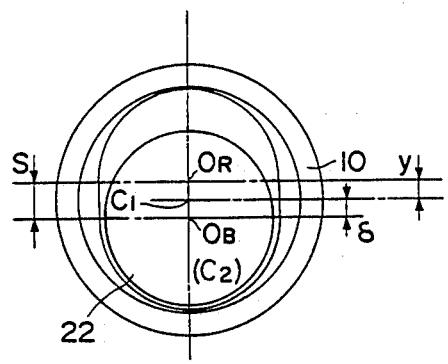
FIG. 2 is a view taken along the arrow II of FIG. 1, with some parts and portions being omitted.

The end of the gear housing 10 from which the rack gear 12 partially projects is formed with a circular outer periphery or groove 10a for the attachment of an end of a protective boot 26, while on the other hand the tie rod 20 is formed at the ball joint 22 side end thereof with a circular outer periphery or groove 20a for the attachment of the other end of the protective boot 26. In this connection, the circular groove 10a of the gear housing 10 is arranged so that its center $C_1$, when viewed in the side elevation of FIG. 2, is equidistant from the center axis $O_R$ of the rack gear 12 and the center $O_B$ of rotary motion of the ball joint 22. On the other hand, the circular groove 20a is formed concentrically with the tie rod 20 so that its center $C_2$ coincides with the center $O_B$ of rotary motion when viewed in the side elevation of FIG. 2 and when the ball member 22b is held in parallel with the rack gear 16. The protective boot 26 is made of a flexible material such as rubber and has a corrugated tubular portion 26a extending along the axes of the rack gear 16 and the ball joint 22 and terminating in circular ends 26b and 26c which are shaped correspondingly to the circular grooves 10a and 20a and fitted therein and fastened thereto by means of clamps 28 and 30. The protective boot 26 thus covers an end of the rack gear 16 and the ball joint 22 in such a manner as to prevent access of dust, mud, water and the like foreign substances thereto.

While the present invention has been described and shown as to only an end of a rack gear and its associated parts, the other end and the associated parts thereof are constructed and arranged in the same way as having been described and shown in the foregoing.

Since the protective boot 26 whose ends 26b and 26c are respectively attached to an end of the gear housing 10 and an end of the tie rod 20 is frequently subject to expansion and contraction in the axial direction thereof when in use, the protective boot 26 is strongly required to have a good durability. For this reason, it is desirable that the protective boot 26 is arranged along the axes of the gear housing 10 and the tie rod 20 so that it can be simple in shape and compact in size.

In the rack and pinion steering gear according to the present invention, the circular groove 10a of the gear housing 10 to which the end 26b of the protective boot 26 is attached is formed to be circular, with its center $C_1$ being arranged to be equidistant from the center axis $O_R$ of the rack gear 12 and the center $O_B$ of rotary motion of the ball joint 22 when viewed in an elevation perpendicular to the center axis $O_R$ of the rack gear 12 while the center $C_2$ of the groove 20a to which the other end 26c of the protective boot 26 is attached being formed coaxially with the center $O_B$ of rotary motion of the ball joint 22. By this, the protective boot 26 can be fittingly attached to the circular groove 10a of the gear housing 10 while at the same time the protective boot 26 can be arranged nearly coaxially of the rack gear 16 without making the end 26a of the rubber boot 26 so large since the distance $\delta$ between the center $C_1$ of the circular groove 10a in the gear housing 10 and the center $C_2$ of the circular groove 20a in the tie rod 20 with respect to the side elevation of FIG. 2 can be $\frac{1}{2}$ S (i.e., $\delta = \frac{1}{2} S$) where S is the distance between the center $O_B$ of the ball joint 22 and the center axis $O_R$ of the rack gear 16 with respect to the same side elevation. Accordingly, twist of the protective boot 26 does not occur or at least hardly occurs and therefore an improved durability of same results.

The circular groove 10a in the gear housing 10 can be made minimum in size when determined by the following expression:

$$C = B + 2y$$

where C is the diameter of the circular groove 10a, B is the diameter of a circular groove corresponding to the circular groove 10a when the ball joint 22 is otherwise of the type having its center $O_B$ of rotary motion concentric with the center axis $O_R$ of the rack gear 16 and y is the distance between the center axis $O_R$ of the rack gear 16 and the center $C_1$ of the circular groove 10a in the gear housing 16 when viewed in an elevation perpendicular to the center axis $O_R$ of the rack gear 16.

From the foregoing, it will be understood that according to the present invention a protective boot for covering an end of a rack gear and its associated ball joint can be formed into a simply shaped one-piece since the ball joint is adapted to have a center of rotary motion which is offset from the center axis of a rack gear by a predetermined distance and also adapted so that its ball member is axially alignable with a straight line which is parallely offset from the center axis of the rack gear. This is quite effective for improving the durability of a protective boot for covering an end of the rack and the ball joint without deteriorating the seal of the rack gear and the ball joint while at the same time retaining freedom of arrangement of the steering linkage.

It is further to be understood that according to the present invention the rack gear housing as well as the rubber boot can be compact in size since the center of the gear housing side end of the rubber boot is arranged to be equidistant from the center axis of the rack gear and the center of rotary motion of the ball joint when viewed in an elevation perpendicular to the center axis of the rack gear.

What is claimed is:

1. A rack and pinion steering gear for a road vehicle comprising:
   a gear housing mounted on a vehicle body;
   a pinion enclosed in said gear housing and rotatable with a manually operated steering wheel;
   a rack gear enclosed in said gear housing and meshed with said pinion for reciprocating motion;
   a tie rod for transmitting motion of said rack gear to a steerable vehicle wheel;
   a ball joint connecting said tie rod to said rack gear and having a center of rotary motion which is offset from the center axis of said rack gear; and
   a protective boot covering said ball joint and an associated end of said rack gear and having opposed ends respectively attached to an end of said gear housing and an end of said tie rod;
   in which said ball joint includes a ball member ending in a ball and is arranged so that said ball member is axially alignable with a straight line which is parallely offset from the center axis of said rack gear; and
   in which said end of said gear housing has a circular outer periphery of which center is substantially equidistant from the center axis of said rack gear and the center of rotary motion of said ball joint when viewed in an elevation perpendicular to the center axis of said rack gear.

2. A rack and pinion steering gear for a road vehicle as set forth in claim 1, in which said end of said tie rod has a circular outer periphery of which center is arranged concentrically with said center of rotary motion of said ball joint.

3. A rack and pinion steering gear for a road vehicle as set forth in claim 2, in which said circular outer periphery of said gear housing is of such a diameter that is determined by the following expression:

$$C = B + 2y$$

where C is the diameter of said circular outer periphery of said gear housing, B is the diameter of a circular outer periphery corresponding to said outer periphery when said ball joint is otherwise of the type having its center of rotary motion concentric with said center axis of said rack gear and y is the distance between the center axis of said rack gear and the center of said circular outer periphery of said gear housing when viewed in an elevation perpendicular to the center axis of said rack gear.

4. A rack and pinion steering gear for a road vehicle as set forth in claim 1, in which said protective boot is made of a flexible material and has a generally straight tubular shape.

* * * * *